US009870524B2

(12) United States Patent
Togashi

(10) Patent No.: US 9,870,524 B2
(45) Date of Patent: Jan. 16, 2018

(54) IMAGE FORMING APPARATUS AND COMPUTER PROGRAM PRODUCT FOR PERFORMING COLOR ADJUSTMENT BASED ON COLOR SHIFT AND TENDENCY FOR COLOR SHIFT OVER TIME

(71) Applicant: FUJI XEROX CO., LTD., Tokyo (JP)

(72) Inventor: Takuhiro Togashi, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 14/933,791

(22) Filed: Nov. 5, 2015

(65) Prior Publication Data

US 2016/0379099 A1 Dec. 29, 2016

(30) Foreign Application Priority Data

Jun. 24, 2015 (JP) ................................ 2015-126956

(51) Int. Cl.
*G06K 15/02* (2006.01)
*H04N 1/00* (2006.01)
(Continued)

(52) U.S. Cl.
CPC ....... *G06K 15/1878* (2013.01); *G06K 15/027* (2013.01); *H04N 1/00005* (2013.01); *H04N 1/00015* (2013.01); *H04N 1/00023* (2013.01); *H04N 1/00031* (2013.01); *H04N 1/00045* (2013.01); *H04N 1/00055* (2013.01);
(Continued)

(58) Field of Classification Search
CPC ........... H04N 1/00015; H04N 1/00023; H04N 1/00031; H04N 1/00034; H04N 1/00045; H04N 1/00055; H04N 1/00082; H04N 1/00087; H04N 1/60; H04N 1/603; H04N 1/6033; H04N 1/6036; H04N 1/6044; G06K 15/027; G06K 15/1878
See application file for complete search history.

(56) References Cited

U.S. PATENT DOCUMENTS 6,950,197 B1 * 9/2005 Nakajima .............. B41J 29/393 358/1.1
7,898,690 B2 * 3/2011 Matsuzawa .......... H04N 1/4057 358/1.9
(Continued)

FOREIGN PATENT DOCUMENTS

JP 2006-171322 A 6/2006
JP 2013-197605 A 9/2013

*Primary Examiner* — Scott A Rogers
(74) *Attorney, Agent, or Firm* — Sughrue Mion, PLLC

(57) ABSTRACT

Provided is an image forming apparatus including an image forming section that periodically forms a color calibration image which is used for color adjustment along with an image on a recording material, a color information obtaining section that periodically obtains color information of the color calibration image which is formed on the recording material before color adjustment which is periodically performed, and a color adjusting section that, based on plural pieces of the color information that is obtained by the color information obtaining section, performs color adjustment on an image formed by the image forming section such that a difference between a color of an image which is supposed to be output and a color of an image which is output is reduced by a next color adjustment.

7 Claims, 10 Drawing Sheets

(51) Int. Cl.
*H04N 1/60* (2006.01)
*G06K 15/10* (2006.01)
*G06K 15/14* (2006.01)
*H04N 1/29* (2006.01)

(52) U.S. Cl.
CPC ....... *H04N 1/00087* (2013.01); *H04N 1/6036* (2013.01); *H04N 1/6044* (2013.01); *G06K 15/102* (2013.01); *G06K 15/14* (2013.01); *H04N 1/29* (2013.01); *H04N 2201/0094* (2013.01)

(56) References Cited

U.S. PATENT DOCUMENTS 8,280,161 B2 * 10/2012 Dalal ................... H04N 1/6033 358/1.9
8,305,665 B2 * 11/2012 Sakamoto ................. G01J 3/46 347/19
9,013,754 B1 * 4/2015 Sugi .......................... H04N 1/46 358/1.9
9,684,856 B2 * 6/2017 Suzuki ............... H04N 1/00034
2005/0062753 A1 * 3/2005 Kitazawa ............. H04N 1/6033 345/589
2005/0146738 A1 * 7/2005 Narazaki ................ H04N 1/603 358/1.9
2009/0015851 A1 * 1/2009 Yamaguchi .......... H04N 1/6033 358/1.9
2014/0160498 A1 * 6/2014 Yano ..................... G06F 3/1208 358/1.9
2015/0317549 A1 * 11/2015 Togashi ............... G06K 15/027 358/1.9
2016/0044209 A1 * 2/2016 Tsukano ................... H04N 1/60 358/1.9

* cited by examiner

FIG. 5A

〈USER SETTING INFORMATION〉

- PERFORMANCE INTERVAL : 2 HOURS
- PAGE INTERVAL : 2000p
- UPDATE DURING JOB : Yes
- FWA RESPONSE : LOW SPEED (HIGH SPEED)

FIG. 5B

〈INTERNAL SETTING INFORMATION〉

- NEXT TIME FOR PERFORMANCE : 14:30
- NEXT PERFORMANCE COUNTER : 100000p
- LAST FWA PREPARATION TIME : 2 MINUTES
- MAXIMUM FWA PREPARATION TIME VALUE : 5 MINUTES
- LAST FWA EXECUTION TIME : 4 MINUTES
- MAXIMUM FWA EXECUTION TIME VALUE : 7 MINUTES

IMAGE FORMING APPARATUS AND COMPUTER PROGRAM PRODUCT FOR PERFORMING COLOR ADJUSTMENT BASED ON COLOR SHIFT AND TENDENCY FOR COLOR SHIFT OVER TIME

CROSS-REFERENCE TO RELATED APPLICATIONS

This application is based on and claims priority under 35 USC 119 from Japanese Patent Application No. 2015-126956 filed Jun. 24, 2015.

BACKGROUND

Technical Field

The present invention relates to an image forming apparatus and a non-transitory computer readable medium storing a program.

SUMMARY

According to an aspect of the invention, there is provided an image forming apparatus including:

an image forming section that periodically forms a color calibration image which is used for color adjustment along with an image on a recording material;

a color information obtaining section that periodically obtains color information of the color calibration image which is formed on the recording material before color adjustment which is periodically performed; and a color adjusting section that, based on plural pieces of the color information that is obtained by the color information obtaining section, performs color adjustment on an image formed by the image forming section such that a difference between a color of an image which is supposed to be output and a color of an image which is output is reduced by a next color adjustment.

BRIEF DESCRIPTION OF THE DRAWINGS

Exemplary embodiments of the present invention will be described in detail based on the following figures, wherein:

FIGS. 5A and 5B are diagrams illustrating internal setting information that a setting unit sets;

DETAILED DESCRIPTION

First Exemplary Embodiment

Description of Entire Configuration of Image Forming Apparatus

Figure 1:
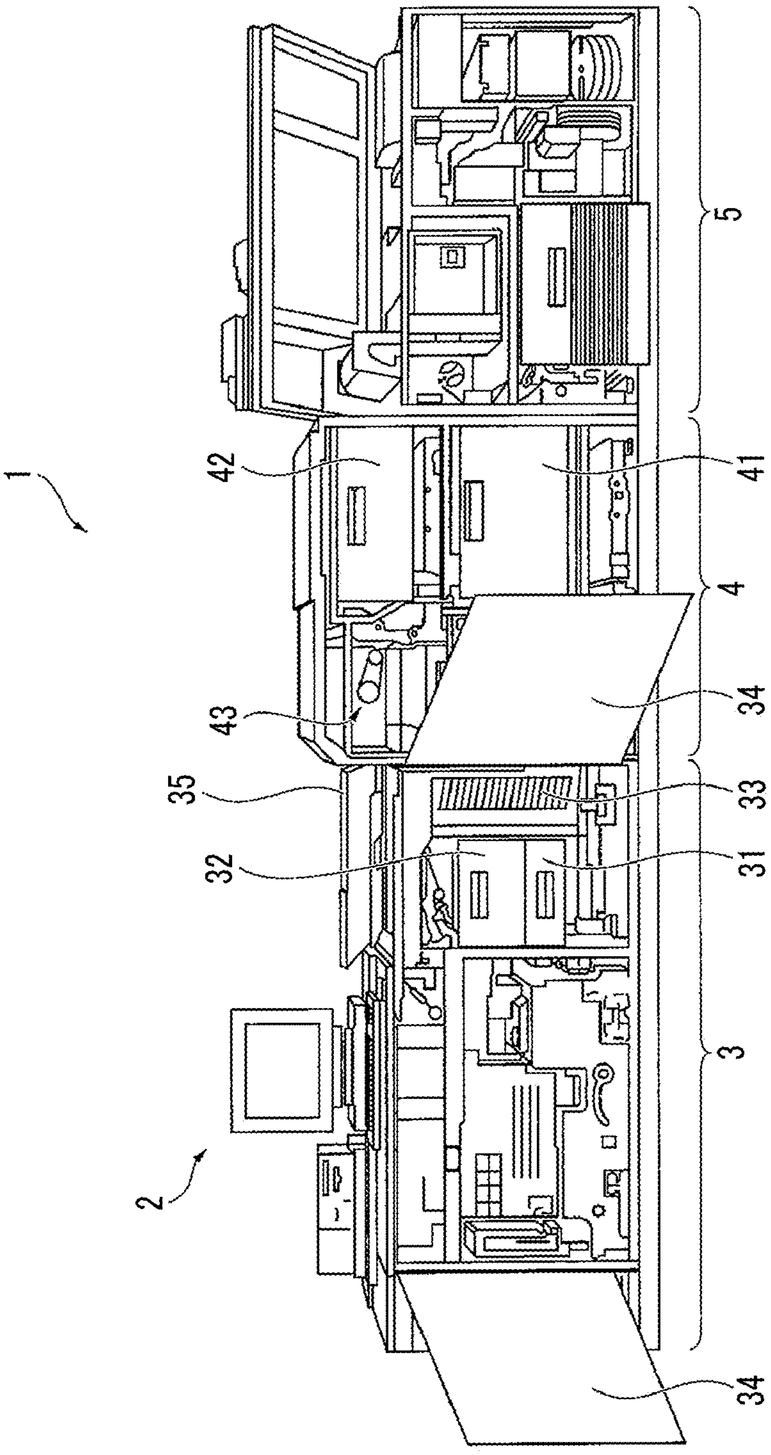
FIG. 1 is a diagram illustrating an entire configuration example of an image forming apparatus according to a first exemplary embodiment.

FIG. 1 is a diagram illustrating an entire configuration example of an image forming apparatus 1 according to a first exemplary embodiment. The image forming apparatus 1 is provided with a control section 2 and an image forming section 3. The control section 2 controls each functional unit of the image forming apparatus 1. The image forming section 3 serves as a printing mechanism that forms an image on a paper (recording material or recording medium). The image forming apparatus 1 is further provided with a paper storing section 4 and a post-processing section 5. The paper storing section 4 stores papers used in the image forming section 3. The post-processing section 5 performs post-processing on papers on which images are formed by the image forming section 3.

The control section 2 of the image forming apparatus 1 is connected to an unillustrated network and receives print data (image data) from an unillustrated personal computer (PC) or the like through the network. Although described in detail later, the control section 2 transmits the print data to the image forming section 3 after performing necessary image processing such as color adjustment. The control section 2 may be provided with an input device such as a touch panel or a keyboard.

The image forming section 3 forms an image on a paper by using plural coloring materials. The image forming section 3 is, for example, an electrophotographic type in the present exemplary embodiment. That is, for example, a photoreceptor that is formed into a drum shape is uniformly charged, and the photoreceptor is exposed to light that is controlled based on the print data to form an electrostatic latent image on the photoreceptor. Then, a developing device turns the electrostatic latent image into a visible image (toner image) that is formed by toner which is a coloring material. Furthermore, the toner image is transferred to the paper, and the toner image is fixed by applying heat and pressure with a fixing device to form an image. The image forming section 3 is not limited to an electrophotographic type and may be an ink jet type that uses ink as a coloring material to form an image by discharging ink onto a recording medium.

The image forming section 3 is provided with paper trays 31 and 32 separately from later-described paper trays 41 and 42 of the paper storing section 4. In addition, the image forming section 3 is provided with an unillustrated transport system that transports papers from the paper trays 31 and 32 to the image forming section 3. The image forming section 3 is further provided with an exit tray unit 33. The paper on which the image is formed by the image forming section 3 is discharged to the exit tray unit 33 when post-processing by the post-processing section 5 is not required. The image forming section 3 is provided with openable and closable lids 34 and 35. Maintenance such as adjusting each functional unit of the image forming section 3, exchanging consumables, and removing papers when there is a jam (paper jam) is performed by opening the openable and closable lids 34 and 35.

The image forming section 3, described in detail later, is provided with an image reading device 100 (refer to FIGS. 2A and 2B) that reads the image which is fixed by the fixing device. The image reading device 100 functions as a color information obtaining unit that obtains color information (color data) of a color calibration image which is used for color adjustment.

The paper storing section 4 is provided with the paper trays 41 and 42. Each of the paper tray 41 and the paper tray 42 may store papers along with the paper trays 31 and 32. A paper that is fit for the print data is selected by the control section 2, and the paper is withdrawn from one of the paper trays 31, 32, 41, and 42 and is transported to the image forming section 3 by the unillustrated transport system. The paper storing section 4 is a so-called optional device. More paper storing sections 4 may be installed when the paper trays 31 and 32 of the image forming section 3 are not sufficient enough for storing various types of papers. Accordingly, the paper storing section 4 does not have to be provided when the paper trays 31 and 32 are sufficient.

The paper storing section 4 is provided with a paper transporting unit 43 in the upper portion thereof. When post-processing is performed by the post-processing section 5, papers are transported by the paper transporting unit 43 from the image forming section 3 to the post-processing section 5.

In the post-processing section 5, processes such as cutting, folding work, punching, filing, and bookbinding are performed as post-processing on the paper on which the image is formed. The post-processing section 5 is also a so-called optional device. The post-processing section 5 does not have to be connected when post-processing is not required.

Description of Image Reading Device 100

Figure 2A:
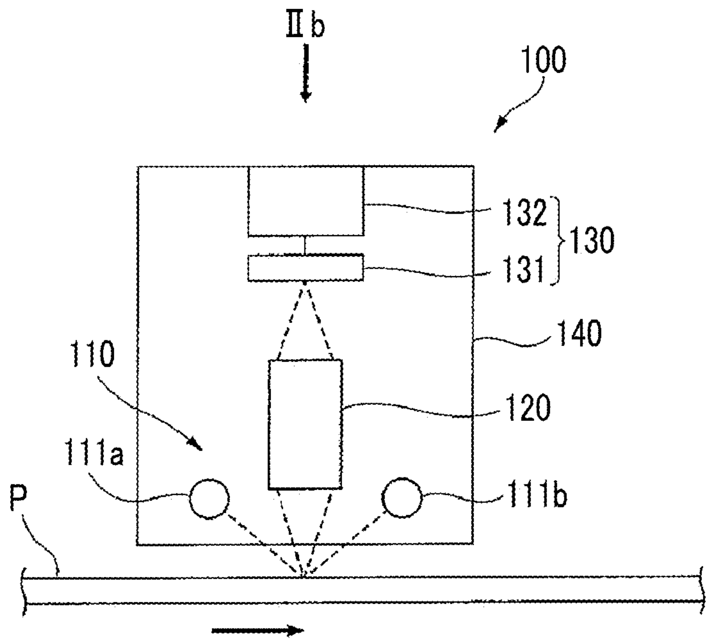
FIGS. 2A and 2B are diagrams illustrating an image reading device.
Figure 2B:
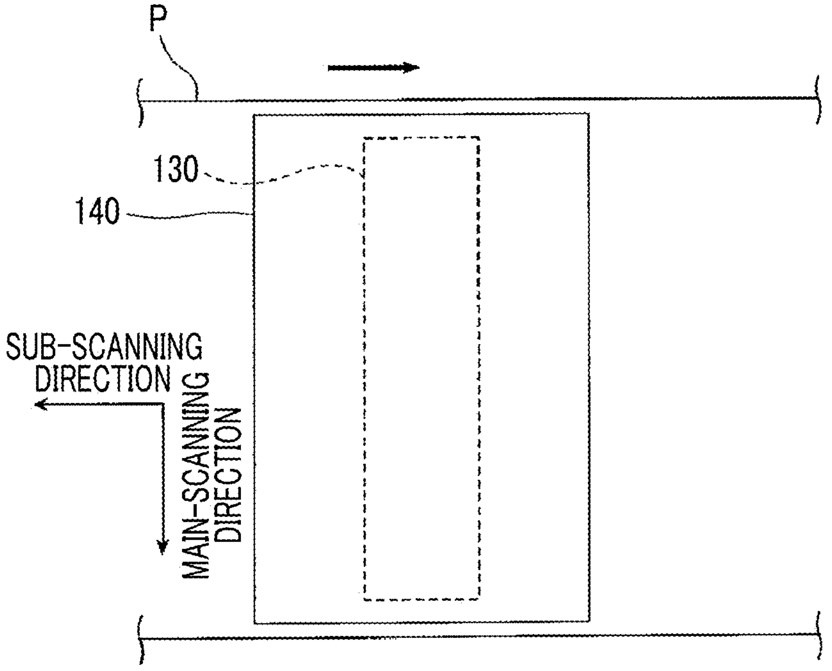

FIGS. 2A and 2B are diagrams illustrating the image reading device 100. FIG. 2A is a diagram of the image reading device 100 when viewed from the same direction as FIG. 1. FIG. 2B is a diagram of the image reading device 100 when viewed from the direction designated by IIb in FIG. 2A. As illustrated in FIGS. 2A and 2B, the image reading device 100 is provided with a light source 110, an optical system 120, a charge-coupled device (CCD) sensor 130, and a casing 140.

The light source 110 irradiates a paper P on which an image is formed with light. The light source 110 is configured of, for example, a pair of tungsten lamps 111*a* and 111*b*. The light source 110 irradiates the image formed on the paper P with light and generates reflective light that includes information of the image.

The optical system 120 guides light reflected by the image formed on the paper P to the CCD sensor 130. In the present exemplary embodiment, the optical system 120 is configured of a Selfoc lens array (SLA, registered trademark) that is a lens array. The Selfoc lens array generally causes diffuse reflected light of the reflective light from the image to be collected and to be formed into an image on the CCD sensor 130.

The CCD sensor 130 receives light that is guided by the optical system 120. A CCD 131 as a pixel receiving light reflected by the image is arranged linearly in the CCD sensor 130. In the present exemplary embodiment, the CCD 131 that corresponds to each of red (R), green (G), and blue (B) colors is arranged into three lines so that measurement of the image is available with each of RGB colors. That is, the CCD 131 is configured as a three-line color CCD. The CCD 131, for example, is arranged in quantities of 7,488 at a pitch of 40 μm for each of RGB colors. That is, the image may be read with 7,488 pixels in a main-scanning direction. Light received by the CCD 131 is photoelectrically converted into charges, and the charges are transferred to a light intensity value generating unit 132.

The charges transferred from the CCD 131 are detected and are turned into a detection signal by the light intensity value generating unit 132. The detection signal is light intensity value data which is color data used for adjusting colors of the image forming section 3. That is, the light intensity value generating unit 132 creates color data used for adjusting colors of the image forming section 3 as the light intensity value data from light that is received by the CCD 131. Since the CCD 131 is a color CCD having three colors of red (R), green (G), and blue (B), the light intensity value generating unit 132 generates an R signal, a G signal, and a B signal that are light intensity value data corresponding to each color.

The casing 140 is a case used for accommodating the light source 110, the optical system 120, and the CCD sensor 130.

Functional Configuration Example of Control Section 2

Figure 3:
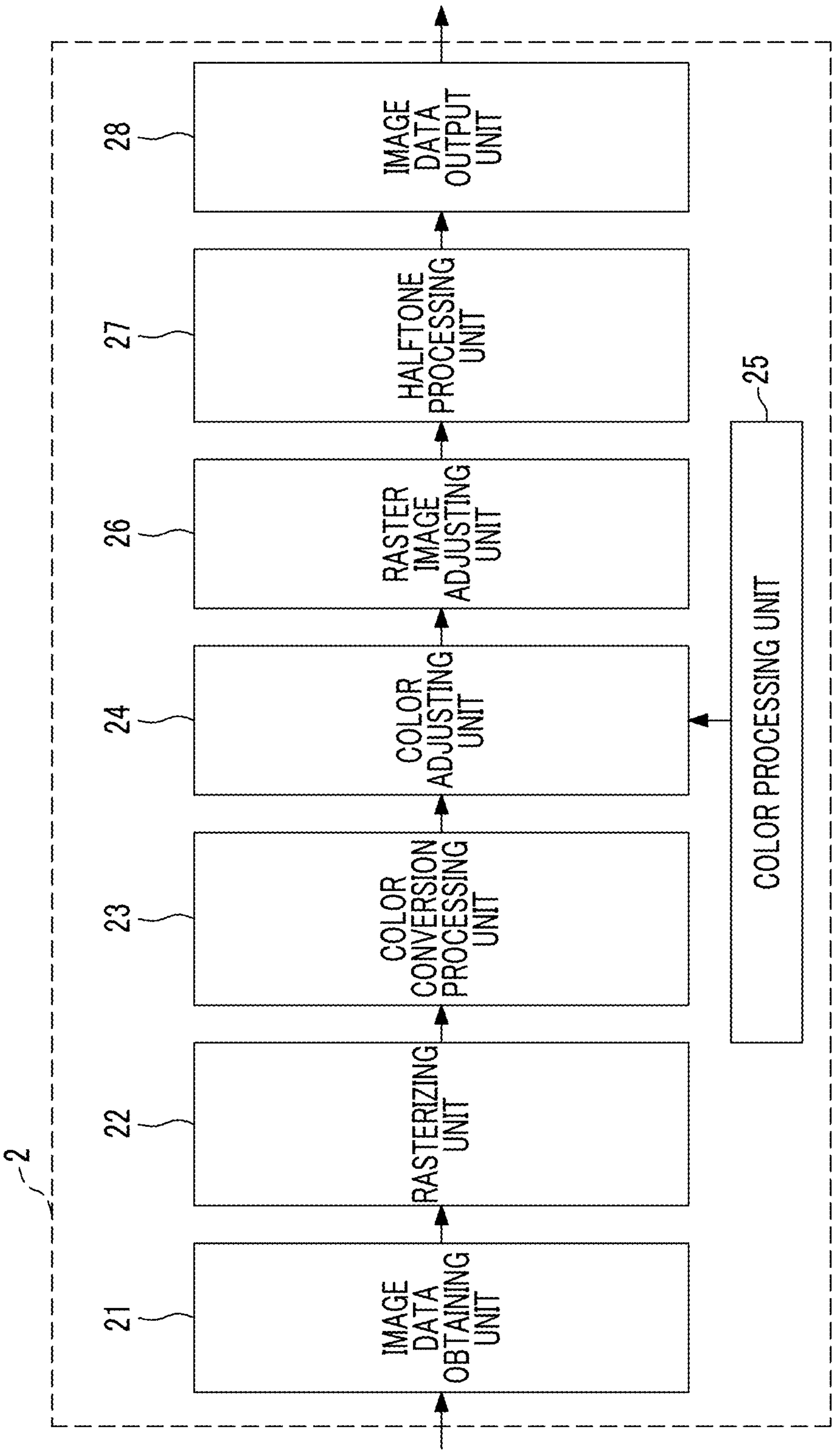
FIG. 3 is a block diagram illustrating a signal processing system in a control section.

FIG. 3 is a block diagram illustrating a signal processing system in the control section 2. The control section 2 is provided with an image data obtaining unit 21, a rasterizing unit 22, a color conversion processing unit 23, a color adjusting unit 24, a color processing unit 25, a raster image adjusting unit 26, a halftone processing unit 27, and an image data output unit 28. The image data obtaining unit 21 obtains print data that is created for outputting an image with the image forming section 3. The rasterizing unit 22 creates a raster image from print data that is written in a page description language (PDL). The color conversion processing unit 23 converts RGB data into CMYK data. The color adjusting unit 24 adjusts color of CMYK data. The color processing unit 25 creates a profile that is used for color adjustment performed by the color adjusting unit 24. The raster image adjusting unit 26 adjusts a raster image that is converted by the color adjusting unit 24. The halftone processing unit 27 performs a halftone process. The image data output unit 28 outputs signal-processed print data to the image forming section 3.

In the present exemplary embodiment, first, the image data obtaining unit 21 receives print data from an external PC. The print data is print data that a user of the PC wants to print with the image forming section 3 and is written in the PDL.

The rasterizing unit 22 converts the print data written in the PDL into raster data for each pixel to produce a raster image. Then, the rasterizing unit 22 outputs the converted raster data as red, green, and blue (RGB) video data (RGB data). At this time, the rasterizing unit 22 outputs the RGB data by one page.

The color conversion processing unit 23 converts the RGB data that is input from the rasterizing unit 22 into device-independent XYZ color values. Then, the color conversion processing unit 23 converts the color values into CMYK data that has reproduction colors (colors of toner which is a coloring material; cyan (C), magenta (M), yellow (Y), and black (K)) of the image forming section 3 and outputs the CMYK data. The CMYK data is configured of Y color data, M color data, C color data, and K color data separated for each color.

The color adjusting unit 24 is an example of a color adjusting section that adjusts the color of an image formed by the image forming section 3. Although described in detail later, the color adjusting unit 24 adjusts colors of the CMYK data according to target colors that are supposed to be originally output by the image forming section 3 in correspondence with the CMYK data. In this case, color adjustment is, for example, a process of converting CinMinYinKin data into CoutMoutYoutKout data ((Cin, Min, Yin, Kin)→(Cout, Mout, Yout, Kout)). In the present exemplary embodiment, this conversion uses a so-called device link profile, in which the CinMinYinKin data is directly converted into the CoutMoutYoutKout data in the same CMYK color space as the CinMinYinKin data without converting into any other color spaces such as the L*a*b* color space.

In the present exemplary embodiment, the device link profile is an example of conversion relationship information regarding the adjustment of the color of the image formed by the image forming section 3 and is created as, for example, a four-dimensional lookup table (LUT). Hereinafter, the four-dimensional LUT may be simply referred to as "LUT".

The color processing unit 25 is an example of a conversion relationship creating section (color processing device) that creates the LUT used for color adjustment performed by the color adjusting unit 24. The color adjusting unit 24 stores the LUT that is created by the color processing unit 25 and performs color adjustment by referring to the LUT.

The raster image adjusting unit 26 performs various adjustments such as γ conversion, definition processing, and a halftone process on the CoutMoutYoutKout data that is input from the color adjusting unit 24 so as to obtain more favorable image quality with the image forming section 3.

The halftone processing unit 27 performs a halftone process on the print data through a dither masking process that uses a dither mask which has a predetermined threshold array in a main-scanning direction and in a sub-scanning direction. Accordingly, the print data, for example, is turned from data represented by multiple values into data represented by binary values.

The image data output unit 28 outputs image data on which image processing such as a color conversion process is performed to the image forming section 3.

It may occur with the image forming section 3 that, for example, the color of the formed image changes as time passes. In this case, since the color of the output image does not match the target color, it is necessary to update the LUT used in the color adjusting unit 24 for matching. Instead of updating the LUT, the later-described γ conversion that is performed in the raster image adjusting unit may be updated. Hereinafter, the process of updating the LUT may be referred to as "calibration".

Functional Configuration Example of Color Processing Unit 25

Figure 4:
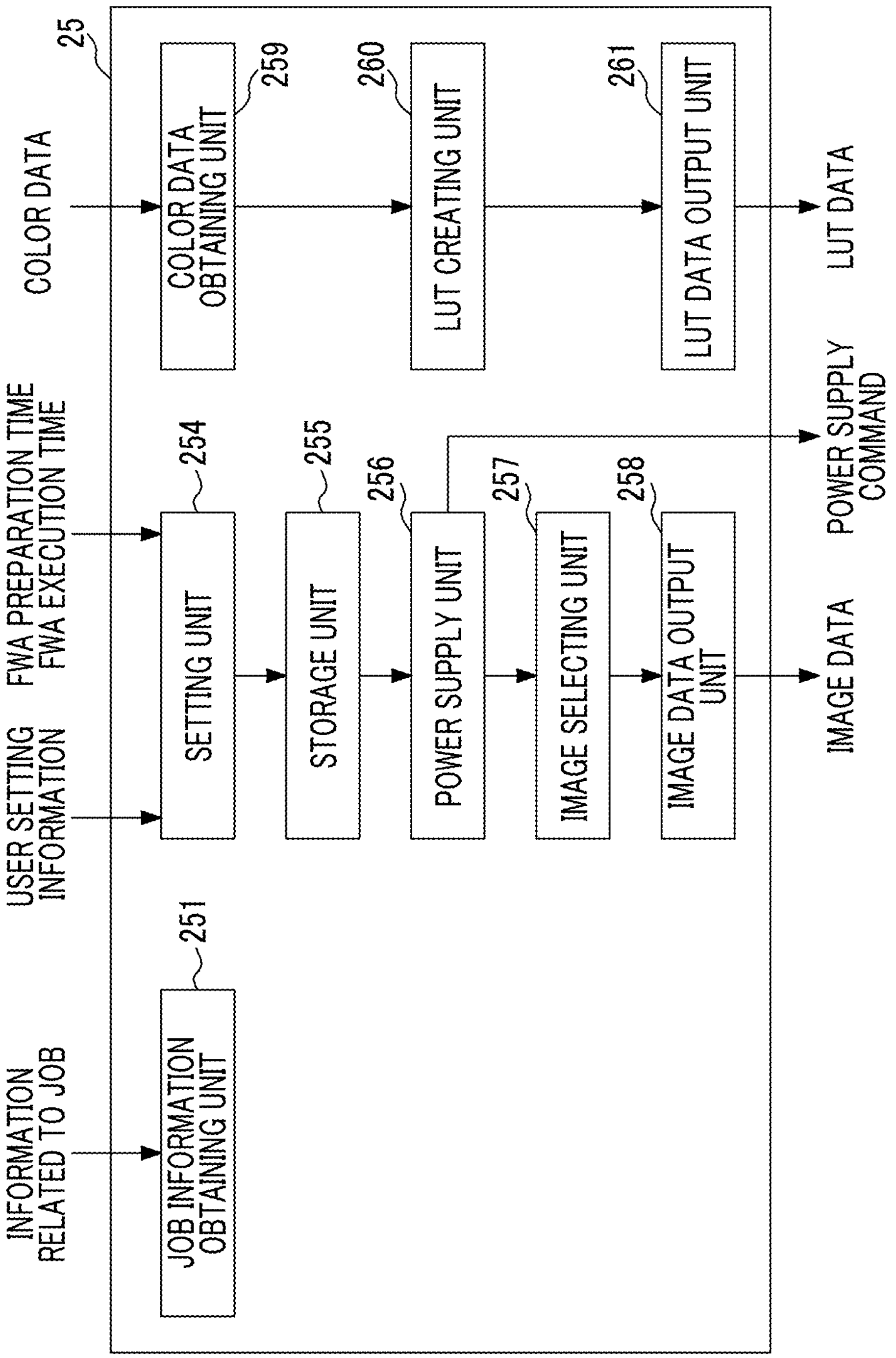
FIG. 4 is a diagram illustrating a functional configuration example of a color processing unit.

FIG. 4 is a diagram illustrating a functional configuration example of the color processing unit 25. As illustrated in FIG. 4, the color processing unit 25 according to the present exemplary embodiment is provided with a job information obtaining unit 251, a setting unit 254, a storage unit 255, a power supply unit 256, an image selecting unit 257, an image data output unit 258, a color data obtaining unit 259, an LUT creating unit 260, and an LUT data output unit 261.

The job information obtaining unit 251 obtains information that is related to an image forming job (print job) performed by the image forming section 3. Although described in detail later, the information related to an image forming job is, for example, a job ID, the size of a paper on which an image is formed, and the number of pages on which images are formed.

The setting unit 254 sets internal setting information. FIGS. 5A and 5B are diagrams illustrating the internal setting information that the setting unit sets. FIG. 5A is a diagram illustrating user setting information that the user sets. The user setting information illustrated in FIG. 5A includes four setting of "performance interval", "page interval", "update during job", and "FWA response". The user may input these types of the user setting information using an input device such as a touch panel or a keyboard of the control section 2.

The "performance interval" represents an interval between calibrations as a period of time. The "performance interval" herein is set as two hours. The "page interval" represents an interval between calibrations as the number of pages. The "page interval" herein is set as 2,000 pages (2,000 p). In this case, it means that each calibration is set to be performed every two hours and every 2,000 pages.

The "update during job" that is determined as "Yes" means that a calibration sequence is allowed during a job. Regarding "FWA response", first, FWA is the abbreviation for "full width array" and indicates the image reading device 100. The "FWA response" is set as either high speed or low speed depending on whether or not later-described background processing is available. That is, background processing is available when "FWA response" is set as high speed, and background processing is unavailable when "FWA response" is set as low speed. This type of the user setting information is transmitted to the setting unit 254 to set the internal setting information.

FIG. 5B is a diagram illustrating the internal setting information that the setting unit 254 sets based on the user setting information. The internal setting information illustrated in FIG. 5B includes six setting of "next time for performance", "next performance counter", "last FWA preparation time", "maximum FWA preparation time value", "last FWA execution time", and "maximum FWA execution time value".

The "next time for performance" is a time for performing the next calibration. Herein, FIG. 5B illustrates that the time is set as 14:30. This is a point in time that is set on the basis that "performance interval" of the user setting information is two hours. In addition, "next performance counter" indicates a counter number at which the next calibration is performed. Herein, FIG. 5B illustrates that the next performance counter is set as 100,000 pages (100,000 p). This is set on the basis that "page interval" of the user setting information is 2,000 pages. The number 100,000, for example, indicates the cumulative number of pages printed in one day when printing is performed.

The "last FWA preparation time" is a period of time that is required to perform a preparation sequence for the image reading device 100 when the last calibration is finished. Herein, "last FWA preparation time" is two minutes. The preparation sequence means a period of time for preparing the light source 110 or means a period of time that is required for the image selecting unit 257 to prepare image data of the color calibration image.

The "maximum FWA preparation time value" is the maximum value for a period of time that is required to perform the preparation sequence for the image reading device 100 when a calibration is previously performed. Herein, "maximum FWA preparation time value" is five minutes.

The "last FWA execution time" is a period of time that is required for the entire calibration sequence of preparing the image reading device 100, obtaining the color data of the color calibration image with the image reading device 100, and creating the LUT when the last calibration is performed. Herein, "last FWA execution time" is four minutes. The calibration sequence is a sequence that includes the preparation sequence, reading of the color calibration image with the image reading device 100 after the end of the preparation sequence, and creation of the LUT by the LUT creating unit 260 based on the read color data.

The "maximum FWA execution time value" is the maximum value for a period of time that is required for the entire calibration sequence in the image reading device 100 when the calibration is previously performed. Herein, "maximum FWA execution time value" is seven minutes.

Returning to FIG. 4, the storage unit 255 stores the internal setting information that the setting unit 254 sets. The storage unit 255 also stores the image data of the color calibration image that the later-described image selecting unit 257 selects. The pattern of the color calibration image is determined in advance. The storage unit 255 stores the image data of the color calibration image in advance.

The power supply unit 256 supplies power to the image reading device 100.

The image selecting unit 257 selects the color calibration image. As the color calibration image, an image in which, for example, the dot percentage (coverage; Cin) is set in 21 levels from 0% to 100% for each single color of CMYK is used. In this case, 21 color calibration images are selected for each of CMYK. A secondary color image in which two colors of CMYK are mixed or a tertiary color image in which three colors thereof are mixed may be prepared as the color calibration image.

The image data output unit 258 outputs the image data of the color calibration image that is selected by the image selecting unit 257.

The color calibration image is printed on a paper in the image forming section 3. The image reading device 100 reads the color of the printed color calibration image. Then, the image reading device 100 transmits the color data that is obtained by reading the color calibration image to the color processing unit 25 of the control section 2. At this time, the color data that the image reading device 100 outputs is, for example, L*a*b* data that is configured of L* data, a* data, and b* data in the L*a*b* color space.

The color data obtaining unit 259 obtains the color data of the color calibration image that is transmitted by the image reading device 100.

The color data obtaining unit 259 obtains the color data at intervals that are shorter than the interval between calibrations. For example, when calibrations are set to be performed every two hours and every 2,000 pages, the color data is obtained every 30 minutes and every 500 pages.

The LUT creating unit 260 is an example of the conversion relationship creating section and creates the LUT based on the color data that is obtained by the image reading device 100. In this case, the LUT creating unit 260 creates the LUT based on the color data of the color calibration image that is formed on the paper. Accordingly, color adjustment is performed with the tone of the paper considered therein.

The LUT creating unit 260, when creating the LUT, obtains a shift tendency with respect to the target color by considering not only the most recent color data that the color data obtaining unit 259 obtains but also the temporal change of previous plural pieces of color data and creates the LUT based on the tendency such that color shifts are suppressed after adjustment. Details of a method for creating the LUT will be described later.

The LUT data output unit 261 transmits the LUT that is created by the LUT creating unit 260 as LUT data to the color adjusting unit 24. The newly created LUT is stored in the color adjusting unit 24. Color conversion of (Cin, Min, Yin, Kin)→(Cout, Mout, Yout, Kout) is performed based on this newly created LUT.

Description of Operation of Color Processing Unit 25

Next, operation of the color processing unit 25 will be described. The color processing unit 25 may operate as a background process. That is, the image data of the color calibration image may be obtained from the image reading device 100 during a job execution by the image forming section 3 to create the LUT.

Figure 6:
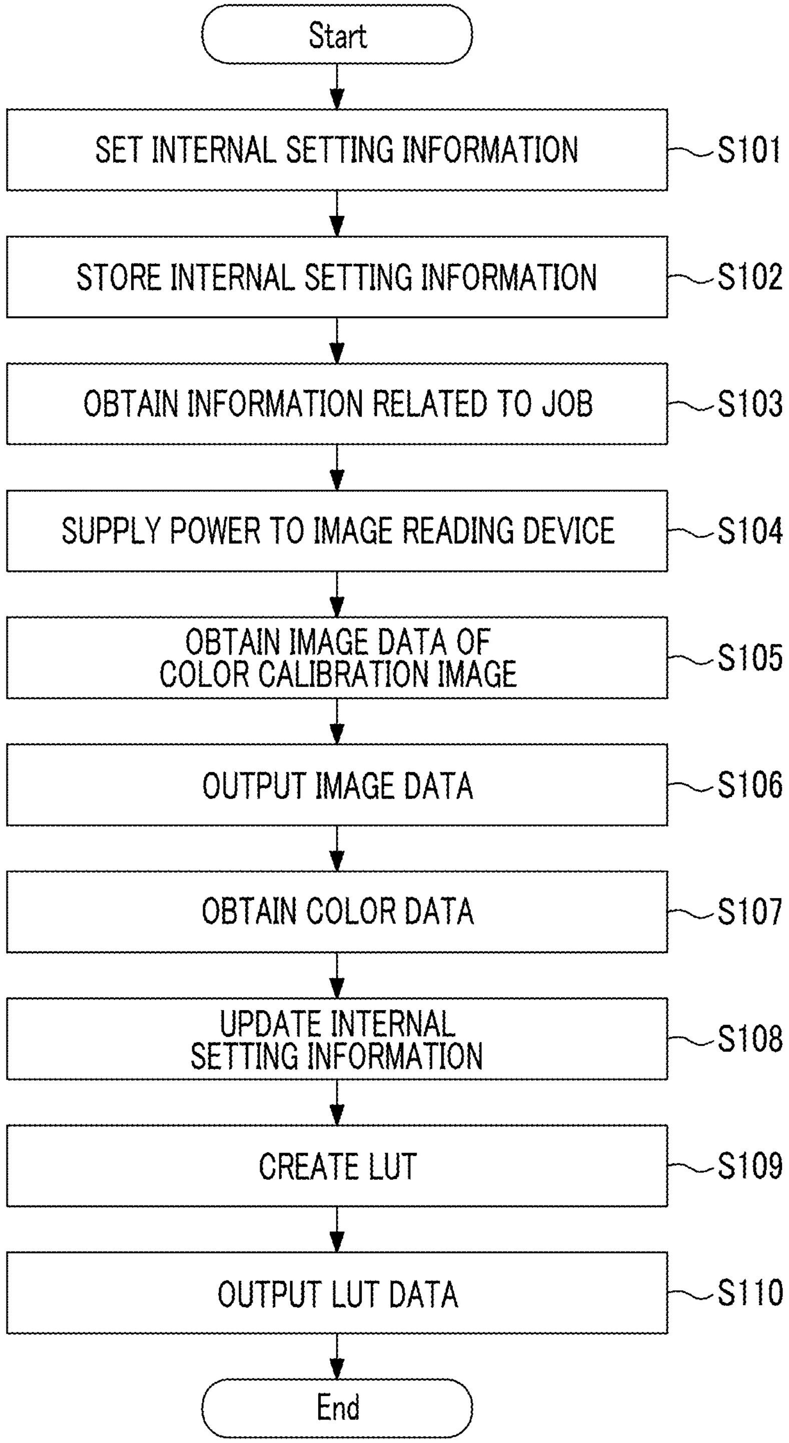
FIG. 6 is a flowchart illustrating operation of the color processing unit according to the first exemplary embodiment.

FIG. 6 is a flowchart illustrating the operation of the color processing unit 25 according to the first exemplary embodiment. Hereinafter, the operation of the color processing unit 25 will be described by using FIG. 4 and FIG. 6.

First, the setting unit 254 obtains the user setting information such as the one illustrated in FIG. 5A and sets the internal setting information such as the one illustrated in FIG. 5B (step 101). The internal setting information is stored in the storage unit 255 (step 102).

Next, the job information obtaining unit 251 obtains the information related to an image forming job performed by the image forming section 3 (step 103). The information related to a job is, as described above, a job ID, the size of a paper on which an image is formed, the number of pages on which images are formed, and the like.

Then, the power supply unit 256 supplies power to the image reading device 100 (step 104). In actuality, the power supply unit 256 transmits a command or the like indicating supply of power to the image reading device 100.

When the preparation sequence for the image reading device 100 ends, the image selecting unit 257 selects the color calibration image and obtains the image data of the color calibration image by referring to the storage unit 255 (step 105). The image data output unit 258 outputs the image data of the color calibration image (step 106).

At this time, the color calibration image that is printed by the image forming section 3 is printed during a job execution. In order for that to occur, it is considered that the color calibration image is printed on a marginal part of a page on which printing is performed by the job that is executed.

Figure 7:
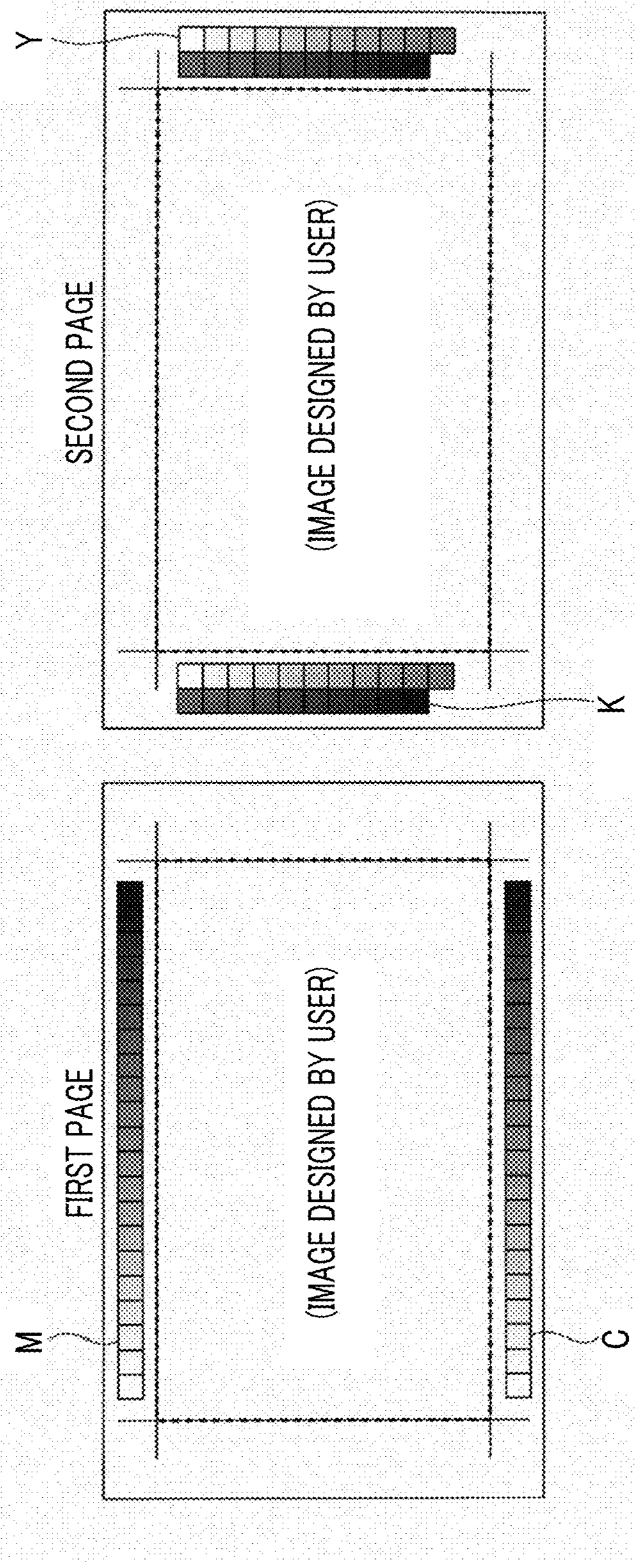
FIG. 7 is a diagram illustrating an example in which a color calibration image is printed on a marginal part of a page.

FIG. 7 is a diagram illustrating an example in which the color calibration image is printed on the marginal part of the page. The illustrated images are for two pages. Images designed by the user are formed around the center of each paper. The ranges of these images are illustrated by dotted lines in FIG. 7. The cyan (C) and magenta (M) color calibration images are respectively printed in the margin at the lower part and the upper part of the first page in FIG. 7. The yellow (Y) and black (K) color calibration images are respectively printed in the margin at the right part and the left part of the second page in FIG. 7. In this case, each color calibration image in which the dot percentage (coverage; Cin) is set in 21 levels from 0% to 100% includes 21 color calibration images.

The marginal part, in this case, is a part that is removed through cutting or the like performed later by the post-processing section 5 (refer to FIG. 1). Thus, it is not a problem to print the color calibration image therein. When such a marginal part does not exist, a page on which the color calibration image is printed may be interposed between pages that are printed by the job that is executed.

The image reading device 100 reads the color calibration image that is printed in a method such as the one described with FIG. 7. As a consequence, the color data obtaining unit 259 obtains the color data of the color calibration image obtained (step 107).

The period of time required for the preparation sequence for the image reading device 100 (FWA preparation time) and the period of time required for the calibration sequence (FWA execution time) are transmitted to the setting unit 254. Part of the internal setting information stored in the storage unit 255 is updated (step 108). Specifically, "last FWA preparation time" and "last FWA execution time" are updated.

The LUT creating unit 260 creates the LUT based on the color data of plural color calibration images obtained (step 109).

The light source 110 of the image reading device 100 may be turned off after the color data of the color calibration image necessary for creating the LUT is obtained.

Next, the LUT data output unit 261 transmits the LUT that is created by the LUT creating unit 260 as LUT data to the color adjusting unit 24 (step 110).

Description of Calibration Operation

In Case of Monotonic Increasing or Monotonic Decreasing

Figure 8A:
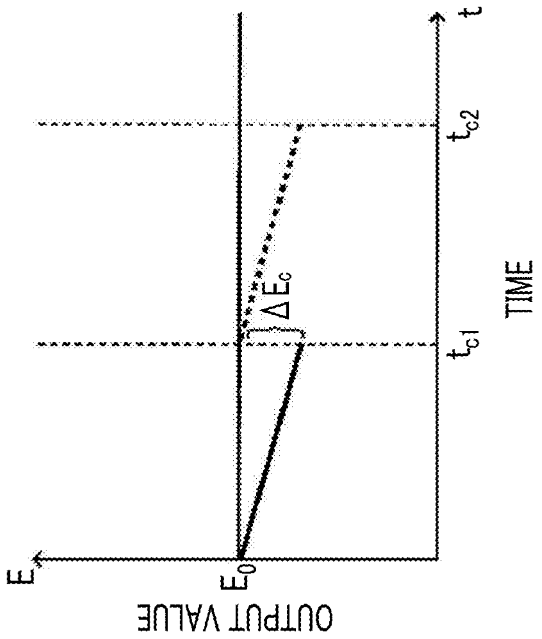
FIG. 8A is a graph diagram illustrating an example of a calibration operation of the related art.
Figure 8B:
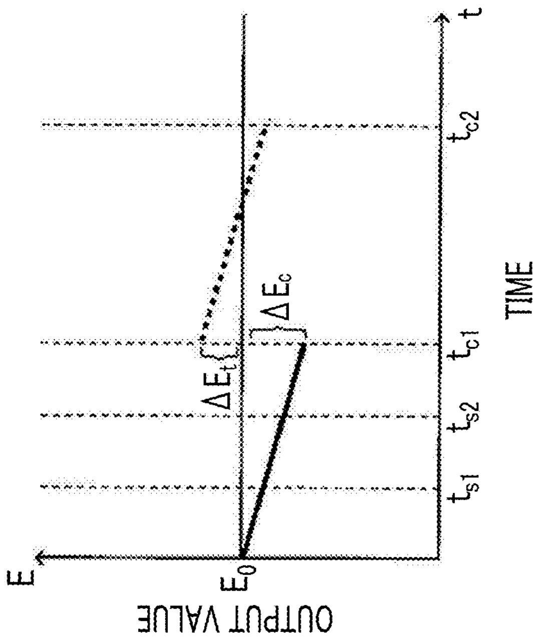
FIG. 8B is a graph diagram illustrating an example of a calibration operation according to the first exemplary embodiment.

FIG. 8A is a graph diagram illustrating an example of a calibration operation of the related art. FIG. 8B is a graph diagram illustrating an example of a calibration operation according to the present exemplary embodiment.

In the calibration of the related art, as illustrated in FIG. 8A, at a predetermined timing $t=t_{c1}$ in the calibration, the LUT creating unit 260 creates the LUT data based on the color data that is obtained by the color data obtaining unit 259, and at $t=t_{c2}$, the LUT creating unit 260 creates the LUT data based on the color data that is obtained by the color data obtaining unit 259.

The color adjusting unit 24 performs color adjustment by $\Delta E_c$ based on the LUT data such that an output value E becomes a target value $E_0$ at the timing $t=t_{c1}$.

Meanwhile, in the calibration according to the present exemplary embodiment, as illustrated in FIG. 8B, the LUT creating unit 260 creates the LUT data with consideration of the temporal change of the color data based on the color data that is obtained by the color data obtaining unit 259 at previous plural timings $t=t_{s1}$, $t_{s2}$, and $t_{c1}$.

That is, since the output values of the color data obtained at the timings $t=t_{s1}$, $t_{s2}$, and $t_{c1}$ tend to decrease, the output value E shifts from the target value $E_0$ in a declining direction as illustrated by a dotted line in FIG. 8A even if color adjustment is performed by $\Delta E_c$ such that the output value E becomes the target value $E_0$ at the timing $t=t_{c1}$ as illustrated in FIG. 8A, and color shifts occur at the timing of the next calibration. Meanwhile, by performing color adjustment by $\Delta E_t$ in addition to the color adjustment by $\Delta E_c$ with consideration of the tendency of the output value E to decrease as illustrated in FIG. 8B, the shift of the output value E from the target value $E_0$ is reduced during the period of $t=t_{c1}$ to $t_{c2}$ as illustrated by a dotted line in FIG. 8B.

The symbol $\Delta E_t$ is obtained by, for example, averaging the shifts of the outputs E obtained at the timings $t=t_{s1}$, $t_{s2}$, and $t_{c1}$ from the reference value $E_0$ and by inverting the sign of the average.

In Case of Random Change

Figure 9A:
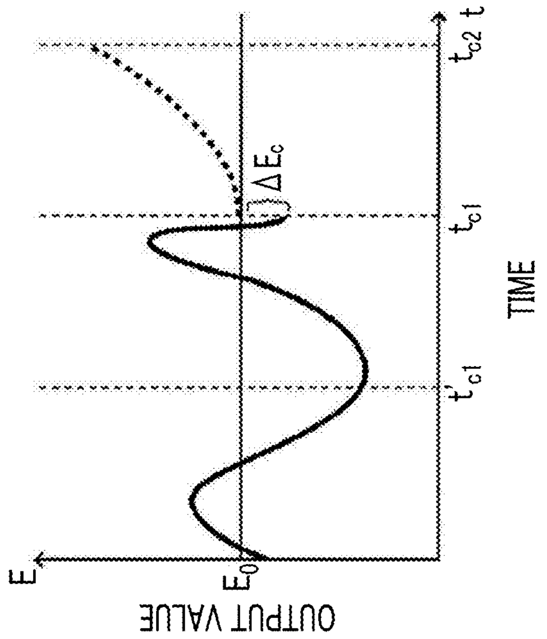
FIG. 9A is a graph diagram illustrating an example of a calibration operation of the related art.
Figure 9B:
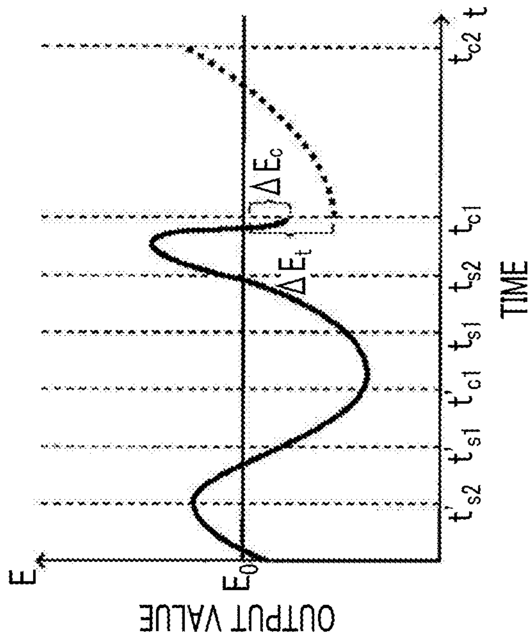
FIG. 9B is a graph diagram illustrating an example of a calibration operation according to the first exemplary embodiment.

FIG. 9A is a graph diagram illustrating an example of the calibration operation of the related art. FIG. 9B is a graph diagram illustrating an example of the calibration operation according to the present exemplary embodiment.

In the calibration of the related art, as illustrated in FIG. 9A, at the predetermined timing $t=t_{c1}$ in the calibration, the LUT creating unit 260 creates the LUT data based on the color data that is obtained by the color data obtaining unit 259, and at $t=t_{c2}$, the LUT creating unit 260 creates the LUT data based on the color data that is obtained by the color data obtaining unit 259.

The color adjusting unit 24 performs color adjustment by $\Delta E_c$ based on the LUT data such that the output value E becomes the target value $E_0$ at the timing $t=t_{c1}$.

Meanwhile, in the calibration according to the present exemplary embodiment, as illustrated in FIG. 9B, the LUT creating unit 260 creates the LUT data with consideration of the temporal change of the color data based on the color data that is obtained by the color data obtaining unit 259 at previous plural timings $t=t'_{s2}$, $t'_{s1}$, $t'_{c1}$, $t_{s1}$, $t_{s2}$, and $t_{c1}$.

That is, since the output values of the color data obtained at the timings $t=t'_{s2}$, $t'_{s1}$, $t'_{c1}$, $t_{s1}$, $t_{s2}$, and $t_{c1}$ tend to change randomly, the output value E shifts from the target value $E_0$ in an inclining direction as illustrated by a dotted line in FIG. 9A even if color adjustment is performed by $\Delta E_c$ such that the output value E becomes the target value $E_0$ at the timing $t=t_{c1}$ as illustrated in FIG. 9A. Meanwhile, by performing color adjustment by $\Delta E_t$ in addition to the color adjustment by $\Delta E_c$ with consideration of the tendency of the output value E to change randomly as illustrated in FIG. 9B, the shift of the output value E from the target value $E_0$ is reduced during the period of $t=t_{c1}$ to $t_{c2}$ as illustrated by a dotted line in FIG. 9B.

The symbol $\Delta E_t$ is obtained by, for example, weighting and adding the shifts of the outputs E obtained at the timings $t=t'_{s2}$, $t'_{s1}$, $t'_{c1}$, $t_{s1}$, $t_{s2}$, and $t_{c1}$ from the reference value $E_0$. The coefficient of the weight, as an example, decreases as the points in time go further back from the timing $t=t_{c1}$.

Effect of First Exemplary Embodiment

According to the first exemplary embodiment, color shifts may be corrected with consideration of the temporal change of the color shifts because not only a shift of the output value ($\Delta E_c$) in the calibration is corrected, but also a correction value ($\Delta E_t$) is determined such that the shift of the output value from the reference value $E_0$ is reduced during the period from one calibration to the next calibration by obtaining a color shift tendency from the temporal change of the previous color data.

The value $\Delta E_t$ may be determined such that the shift of the output E from the reference value $E_0$ is reduced or may be determined such that the change of the output E is reduced. Alternatively, the user may select one of the ways of determination.

Even if correction is performed with the correction value $\Delta E_t$, the interval between calibrations may be shortened, or the user may be notified that the range of change does not reside within a certain range by one calibration when color shifts may occur remarkably from the reference value $E_0$ until the next calibration.

Second Exemplary Embodiment

In a second exemplary embodiment, color adjustment is performed with the same range as the first exemplary embodiment. In addition, the range of the color adjustment is divided into plural ranges in which the user does not visually recognize the color adjustment because the user visually recognizes a color change due to the color adjustment when the range of the color adjustment is greater than or equal to a predetermined value.

Figure 10A:
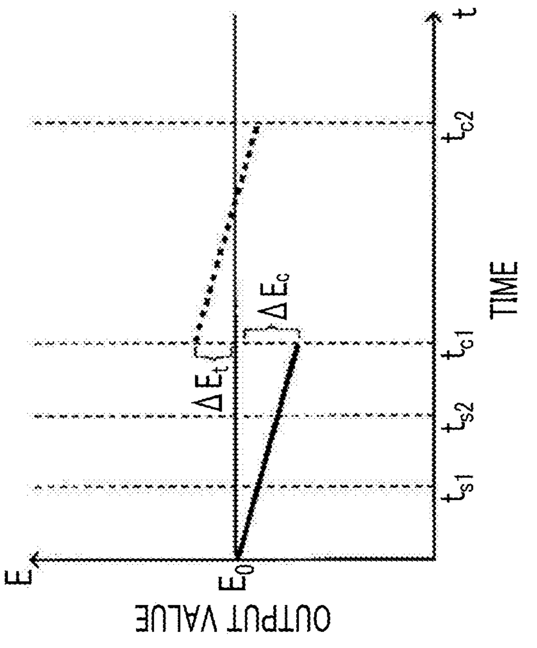
FIG. 10A is a graph diagram illustrating an example of a calibration operation according to the first exemplary embodiment.
Figure 10B:
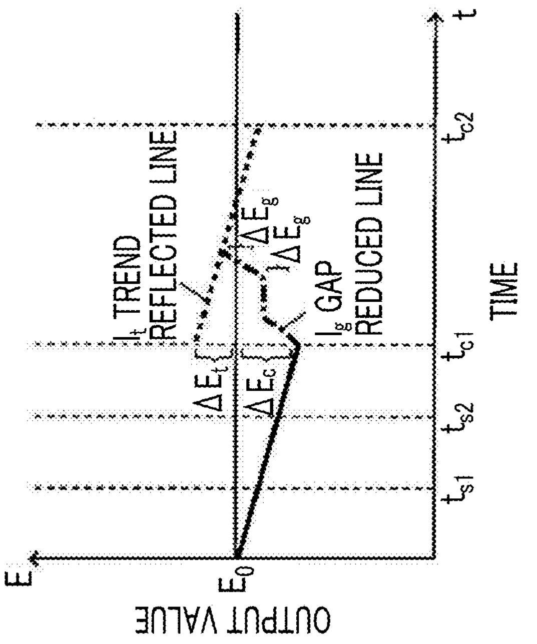
FIG. 10B is a graph diagram illustrating an example of a calibration operation according to a second exemplary embodiment.

FIG. 10A is a graph diagram illustrating an example of the calibration operation according to the first exemplary embodiment. FIG. 10B is a graph diagram illustrating an example of a calibration operation according to the present exemplary embodiment.

In the calibration according to the first exemplary embodiment, as illustrated in FIG. 10A, the LUT creating unit 260 creates the LUT data with consideration of the temporal change of the color data based on the color data that is obtained by the color data obtaining unit 259 at the previous plural timings $t=t_{s1}$, $t_{s2}$, and $t_{c1}$. Thus, the shift of the output value E from the target value $E_0$ is reduced during the period of $t=t_{c1}$ to $t_{c2}$ as illustrated by a dotted line in FIG. 10A by adding color adjustment by $\Delta E_t$ to the color adjustment by $\Delta E_c$.

The range of color adjustment becomes $\Delta E_c+\Delta E_t$, and the range may be increased in comparison with the color adjustment by only $\Delta E_c$ in the related art. Thus, a color change due to the color adjustment may be visually recognized by the user.

Meanwhile, as illustrated in FIG. 10B, the LUT creating unit 260 creates the LUT data with consideration of the range of color adjustment in the calibration according to the present exemplary embodiment.

That is, the output value E is approximated to a trend reflected line $l_t$ by performing color adjustment by a range $\Delta E_g$ that is not visually recognized by the user multiple times at intervals (gap reduced line $l_g$), not by performing the color adjustment by $\Delta E_c+\Delta E_t$ once at the timing $t=t_{c1}$. The color adjustment by the range $\Delta E_g$ may be performed at an interval of a predetermined number of prints instead of being performed at a predetermined interval.

Effect of Second Exemplary Embodiment

According to the second exemplary embodiment, in addition to the effect of the first exemplary embodiment, calibration may be performed such that a color change due to color adjustment is not visually recognized by the user because the output value E is approximated to the trend reflected line $l_t$ by performing the color adjustment not just once by $\Delta E_c+\Delta E_t$ but multiple times at intervals by the range $\Delta E_g$ in which the user does not visually recognize the color adjustment.

Description of Program

The process that the color processing unit 25 performs in the present exemplary embodiment described thus far is achieved by cooperation between software and hardware resources. For example, the process is performed by an unillustrated control CPU in the control section 2 that loads a program which achieves each function of the color processing unit 25 into an unillustrated memory and that executes the program.

Accordingly, the process that the color processing unit 25 performs may be perceived as a program that achieves in a computer a function of obtaining the information related to an image forming job performed by the image forming section 3 and a function of creating the LUT based on the color data obtained by the image reading device 100.

The program that achieves the present exemplary embodiment is obviously provided by a communication section and may also be provided by being stored on a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a processor configured to execute:

an image forming section configured to periodically form a plurality of color calibration images which is used for color adjustment on a recording material;

a color information obtaining section configured to obtain a first color information of a first color calibration image which is formed on the recording material at a first time and obtain a second color information of a second color calibration image which is formed on the recording material at a second time, the first color information and the second color information being obtained before color adjustment which is periodically performed; and a color adjusting section configured to:

determine a first correction value based on a color shift from a reference value, based on the second color information that is obtained by the color information obtaining section;

determine a temporal change value based on the first color information obtained at the first time and the second color information obtained at the second time, the temporal change value indicating a tendency of the color shift in relation to a change in time;

determine a second corrected value based on the temporal change value;

generate a third correction value generated by adding the first correction value and the second correction value; and perform color adjustment on an image formed by the image forming section based on the a third correction value, such that a difference between a color of an image which is supposed to be output and a color of an image which is output is adjusted based on both the color shift and the tendency of the color shift.

2. The image forming apparatus according to claim 1, wherein the color adjusting section is further configured to perform color adjustment with using color information that is obtained by the color information obtaining section and previous color information that corresponds to the color information.

3. The image forming apparatus according to claim 1, wherein the color adjusting section is further configured to determine a fourth correction value based on previous color information that corresponds to the color information, and perform color adjustment based on the third correction value and the fourth correction value.

4. The image forming apparatus according to claim 1, wherein the color adjusting section is further configured to perform color adjustment on an image with a value that is smaller than a predetermined value in a stepwise manner when a difference between the color of an image formed by the image forming section before color adjustment and the color of an image formed after color adjustment exceeds a predetermined value.

5. The image forming apparatus according to claim 2, wherein the color adjusting section is further configured to perform color adjustment on an image with a value that is smaller than a predetermined value in a stepwise manner when a difference between the color of an image formed by the image forming section before color adjustment and the color of an image formed after color adjustment exceeds a predetermined value.

6. The image forming apparatus according to claim 3, wherein the color adjusting section is further configured to perform color adjustment on an image with a value that is smaller than a predetermined value in a stepwise manner when a difference between the color of an image formed by the image forming section before color adjustment and the color of an image formed after color adjustment exceeds a predetermined value.

7. A non-transitory computer readable medium storing a program causing a computer to execute a process for image formation, the process comprising:

periodically forming a plurality of color calibration images which is used for color adjustment on a recording material;

obtaining a first color information of a first color calibration image which is formed on the recording material at a first time and obtaining a second color information of a second color calibration image which is formed on the recording material at a second time, the first color information and the second color information being obtained before color adjustment which is periodically performed;

determining a first correction value based on a color shift from a reference value based on the second color information that is obtained;

determining, a temporal change value based on the first color information obtained at the first time and the second color information obtained at the second time, the temporal change value indicating a tendency of the color shift in relation to a change in time;

determining a second corrected value based on the temporal change value;

generating a third correction value generated by adding the first correction value and the second correction value; and performing color adjustment on an image formed based on the third correction value such that a difference between a color of an image which is supposed to be output and a color of an image which is output is adjusted based on both the color shift and the tendency of the color shift.

* * * * *